(12) United States Patent
Eldredge et al.

(10) Patent No.: US 6,697,801 B1
(45) Date of Patent: Feb. 24, 2004

(54) METHODS OF HIERARCHICALLY PARSING AND INDEXING TEXT

(75) Inventors: Michael A. Eldredge, Springville, UT (US); Russell C. Johnson, Saratoga Springs, UT (US); Ronald P. Millet, Orem, UT (US); Bruce R. Tietjen, Highland, UT (US); John P. Pratt, Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 330 days.

(21) Appl. No.: 09/652,267

(22) Filed: Aug. 31, 2000

(51) Int. Cl.[7] ............................................. G06F 17/30
(52) U.S. Cl. ........................ 707/6; 707/100; 707/102
(58) Field of Search .................... 707/6, 102, 1–5, 707/100, 3

(56) References Cited

U.S. PATENT DOCUMENTS

| | | | |
|---|---|---|---|
| 5,369,577 A | * | 11/1994 | Kadashevich et al. ......... 704/9 |
| 5,864,863 A | * | 1/1999 | Burrows ................. 707/103 R |
| 5,890,103 A | * | 3/1999 | Carus ............................ 704/9 |
| 5,893,109 A | | 4/1999 | DeRose et al. |
| 5,940,836 A | * | 8/1999 | Fukushima ............... 707/104.1 |
| 6,021,409 A | * | 2/2000 | Burrows ..................... 707/102 |
| 6,055,544 A | | 4/2000 | DeRose et al. |
| 6,101,511 A | | 8/2000 | DeRose et al. |
| 6,101,512 A | * | 8/2000 | DeRose et al. ............. 715/514 |
| 6,105,044 A | * | 8/2000 | DeRose et al. ............. 715/514 |
| 6,189,006 B1 | * | 2/2001 | Fukushima .................... 707/6 |
| 6,216,123 B1 | * | 4/2001 | Robertson et al. ............. 707/3 |
| 6,278,992 B1 | * | 8/2001 | Curtis et al. ................... 707/3 |

\* cited by examiner

*Primary Examiner*—Greta Robinson
*Assistant Examiner*—Debbie M. Le
(74) *Attorney, Agent, or Firm*—Dinsmore & Shohl LLP (57) ABSTRACT

Methods of hierarchically parsing and indexing text are provided. A source text is parsed to identify first level text entities and lower level text entities wherein the lower level text entities are subsets of their parent text entities. First level text entities are assigned a first level value corresponding to their locations within the source text, and lower level text entities are assigned lower level values, subordinate to their corresponding parent level value. Multiple levels of text entity parsing and numbering may take place. The association of linguistically derived variants of the text entities with their locations takes place.

19 Claims, 4 Drawing Sheets

```
460 — SOURCE : " NOT ! ! " SAID THE MAILMAN.

465 — INDEX VALUES

1     "NOT — 470
        1.0   NOT — 475
        1.1   "   — 480
        1.2   NOT — 490

2     ! ! " — 500
        2.0   !   — 505
        2.1   !   — 510
        2.2   !   — 520
        2.3   "   — 530

3     SAID — 540
        3.0   SAID — 545
        3.1   SAID — 547

4     THE — 550
        4.0   THE — 555
        4.1   THE — 557

5     MAILMAN. — 560
        5.0   MAILMAN — 565
        5.1   MAILMAN — 567
        5.1.1 MAIL — 570
        5.1.2 MAN — 580
        5.2   — 590
```

460 — SOURCE : " NOT I ! " SAID THE MAILMAN.

465 — INDEX VALUES

1   "NOT — 470
1.0  NOT — 475
1.1  " — 480
1.2  NOT — 490

2   I !" — 500
2.0  I — 505
2.1  I — 510
2.2  ! — 520
2.3  " — 530

3   SAID — 540
3.0  SAID — 545
3.1  SAID — 547

4   THE — 550
4.0  THE — 555
4.1  THE — 557

5   MAILMAN. — 560
5.0  MAILMAN — 565
5.1  MAILMAN — 567
5.1.1 MAIL — 570
5.1.2 MAN — 580
5.2    — 590

FIG. 4

METHODS OF HIERARCHICALLY PARSING AND INDEXING TEXT

FIELD OF THE INVENTION

The present invention relates to methods for hierarchically parsing and indexing text.

BACKGROUND OF THE INVENTION

Parsing and indexing text are paramount concerns in the search and retrieval industry. Text improperly parsed cannot be indexed properly, and a poorly constructed index will yield poor search results and correspondingly poor answer-set accuracy. Moreover, parsing and indexing text efficiently and accurately impacts a wide variety of information technologies, such as data mining, data abstracting, data extracting, data linking, data compression, data presentation, data visualization, data intelligence, and the like.

Search efficiency is often measured in terms of search performance and search accuracy. Because users desire nearly instantaneous results to their searches, user search queries are often conducted against small organized indexes, rather than against a composite body of text in its native format. Indexes improve search performance because search engines can detect matches or hits in structured indexes much more efficiently than in a body of natively formatted text documents.

Search accuracy is primarily governed by the rules employed during index generation. Some rules reduce the amount of information in the index to improve search speed and/or reduce index size. Other rules add information to the index to improve the quality of search results.

An indexer can increase speed and reduce index size by excluding certain words, symbols, and characters from the index. The excluded words are typically those that occur frequently, like 'the' and 'and'. These excluded words are sometimes referred to as stop words. Punctuation and capitalization, as well as symbol characters like the dollar "$", percent "%" and pound "#", and other characters considered to be non-word characters are also typically ignored. While these exclusionary rules do serve to improve search engine response time, search accuracy is sacrificed. Under these rules, a search engine may not be able to respond at all to certain queries, like "to be, or not to be", which may be comprised entirely of non-indexed text.

Existing parsing and indexing techniques partially deal with the organization and representation of text at various levels. Some examples include web site domain names, file system organizations, and documents decomposed as chapters, pages, and paragraphs. Some of these levels are linguistically oriented, such as the representation of noun phrases and grammatical constructs, and other levels focus on the character strings themselves, and may identify how sequences of characters of different types are grouped together into strings and sub-strings. Little progress has been made with respect to the parsing of strings and substrings, which has made search and retrieval particularly problematic and correspondingly less accurate.

Search accuracy is increasingly important as the body of available information continues to expand. The accuracy sacrificed by excluding certain words and characters is a cause of growing frustration for search engine users. As computer processing power and storage capacity increase, the cost of increasing search accuracy decreases.

To improve accuracy, the text being indexed and the search queries themselves are often parsed to identify character strings representing words. Identifying word boundaries presents a number of problems for software implemented parsers and linguistic analyzers. Word boundary parsing software will typically divide words when a symbol character is encountered in a character string. In certain cases, such as "CAD/CAM", the parser will decompose the compound word "CAD/CAM" into two individual words, "CAD" and "CAM". As a result of this lack of ability to detect these compound words as single entities, queries for them yield slightly less precise results.

The changing nature of the text being indexed and searched may also impact search accuracy. Symbol characters typically ignored by indexers are becoming increasingly prominent. Consider the elements of an e-mail or World Wide Web address. The "at" (@) sign, the dot (.), the colon (:), and the slash (/) have all become commonplace. A search for someone's e-mail address, for example, will yield much more accurate results if the indexer does not ignore the at "@" symbol and the dot".".

When a search engine returns a hit to the user, it is useful to be able to see the surrounding text (the sentence or paragraph, for example) which contains the words that matched the query. This is referred to as "showing the hit in context". The context of the hit may either be derived from the index itself, or re-extracted from the original document. It is typically less costly to reconstruct a portion of a document from the index, which is already at hand, than it is to locate and retrieve it from the original document.

Any text excluded during index generation would naturally be unavailable for reconstructing the context of a hit. The more completely the text is indexed, the more closely a reconstructed portion of the text will match the original.

Even an indexer that does not exclude any words or symbols from the index may not be able to reconstruct a hit in context. This is the case when the indexer records only a reference to the source document for each piece of text indexed, and not their relative positions in the document. Knowing the relative positions of each piece of text is required so that they may be reassembled in the proper order.

For example, if an indexer of this type encountered the phrase "apple pie" while indexing a document called "Mom's Recipes", it would generate two entries, "apple" and "pie". Each entry would be stored with a reference to "Mom's Recipes", but with no indication that "apple" came before "pie" or that in fact, the two entries were adjacent to one another.

This lack of knowledge with respect to the ordering of text pieces in the source also disallows proximity searches, where the query specifies that certain terms must occur within a certain distance of each other.

Current computing resources enable indexers to include previously excluded words and symbols and their positions in the source, but that is not all. Indexers may also augment the index with additional information to improve search intelligence. For example, using currently available linguistics technology, an indexer may associate thesauri terms, morphological word roots and forms, phonetic and soundex representations, and alternate spellings with the words being indexed. Advanced indexers may also associate concepts, classifications, and categories with the indexed words, permitting more advanced searches and improving the overall quality and relevance of the search results.

SUMMARY OF THE INVENTION

Accordingly, an object of the invention is to provide methods of hierarchically parsing and indexing text. By parsing and indexing text at a level above what is ordinarily considered a word, and including stop words, symbol characters, and formatting characters along with the hierarchical relationships between the various text pieces, searching, retrieving, mining, abstracting, extracting, visualizing, and presenting the text becomes more useful and accurate.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods of hierarchically parsing and indexing text are provided.

A method of indexing text using a set of executable instructions is provided, comprising receiving one or more characters and recognizing the characters as a first level text entity. Further, lower level text entities are recognized as sub-parts of their parent first level text entities. A first level value is assigned to each first level text entity which is operative to determine the position of the first level text entity in a source text. Moreover, one or more lower level values, which are subordinate to the first level value, are assigned to the lower level text entities. Additionally, the lower level values are operative to determine one or more positions of the lower level text entities in the source text.

Further, a method of data retrieval using a set of executable instructions is provided, comprising parsing a search query into a search criterion, one or more first level text entities, and one or more lower level text entities. One or more index sources, derived from one or more original sources, are searched in accordance with the search criterion for substantial matches on at least one of the first level text entities and one or more of the lower level text entities. Next, at least one of a reference to a matching source, a rendition of the matching source, a portion of the matching source, and the matching source are returned when a substantial match is determined wherein the matching source corresponds to one or more of the original sources.

Finally, a method of warehousing index terms using a set of executable instructions is provided, comprising receiving one or more target sources, parsing each target source into one or more first level text entities and one or more lower level text entities and associating one or more first level values with each first level text entity where the first level values are operative to determine one or more positions of each first level text entity within the target sources. Further, one or more lower level values, subordinate to the first level values, are associated with the lower level text entities when one or more of the lower level text entities are subsets of the first level text entities, the lower level values are operative to determine one or more positions for each lower level text entity within one or more of the target sources. Next, all of the entities and their corresponding values are stored in one or more index sources.

Still other aspects of the present invention will become apparent to those skilled in the art from the following description of an exemplary embodiment which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

The present invention provides methods for hierarchically parsing and indexing text. One embodiment of the present invention is implemented in NOVELL's NetWare operating system environment using NOVELL's QuickFinder search engine, and implemented with the C++ programming language. Of course other operating systems, search engines, and programming languages (now known or hereafter developed) may also be readily employed.

Text is parsed into strings, with each string acquiring a token (e.g. tag or label) which identifies the type of the characters which compose the string. Once the type is known, a variety of processing is performed to produce an index value which represents the string's location in the source text. Each string and the locations of all the occurrences of the string are recorded. At the lowest level, strings comprise single characters. Each character has a type which is typically one, but may be more than one, of the following: alphabetic, numeric, symbolic, ideographic, and formatting.

Alphabetic characters include, by way of example only, standard electronic keyword characters, including the English language alphabetic characters, as well as those used to represent any other spoken and/or written language. Numeric characters include, by way of example only, integer or floating point numbers in base 10 or any other base such as hexadecimal (base 16). Symbol characters include, by way of example only, punctuation and mathematical symbols. Ideographs include those characters representing entire words or ideas, such as Kanji. Formatting characters include, by way of example only, characters which affect the placement of surrounding text, such as newlines, tabs, spaces, paragraph breaks, and page breaks.

For the examples that follow, a first level text entity is defined to be a string of one or more characters from the source text whose boundaries are typically delineated by white space. However, any special character or parsing rule may be used to identify text entity boundaries. For characters not belonging to white space delimited character sets, other rules are employed to determine first level text entity boundaries. Note that the concept of a "word" does not enter into the discussion until a language and dictionary are introduced. A first level integer value is assigned to the first level text entity which records the position of the first level text entity in a source text.

Given the example document containing the string:

"I love to drive my mercedes-benz!"

Six first level text entities are identified. The two-character string comprised of the double quote and the character "I" is first level text entity number one (1), and the string mercedes-benz!" (including the terminating double quote character) is first level text entity number six (6).

Lower level text entities are identified as sub-parts of the first level text entities. For this example, second level text entity boundaries are identified by rules that are based on character type. Moreover, second level integer values are assigned to each second level text entity within the first level text entity. The second level values record the location and relative position of each second level text entity in the parent first level text entity.

In the example, the sixth first level text entity mercedes-benz!" is composed of five second level entities, the string mercedes (6.1), the hyphen (6.2), the string benz (6.3), the exclamation point (6.4), and the double quote (6.5). The second level text entity boundary identification rules are as follows: adjacent alphabetic characters are combined together to form a single second level text entity, as are adjacent numeric characters. Symbol characters, though adjacent, are separate, individual second level text entities.

A special second level text entity is also defined, designated the "dot-zero" entity. The boundary rule for this entity defines it as the subset of characters in the first level text entity beginning with the first alphanumeric character and ending with the last alphanumeric character. In the example, the first first level text entity, ("I), contains the dot-zero second level text entity I(1.0). The last first level text entity, (mercedes-benz!") contains the dot-zero second level text entity mercedes-benz (6.0). For the other text entities, the "dot-zero" entity is equivalent to the first level text entity itself. For first level text entities that contain no alphanumeric characters, the "dot-zero" second level text entity is empty, or null.

Furthermore, additional lower level text entities, such as third level text entities, may be derived from second level text entities based on linguistic analysis or other rules of division, such as capitalization. For example, the string "mailman" (not including the double quotes), if assigned a first level text entity value of 3, would have the string "mail" identified as third level entity 3.1.1, and "man" as 3.1.2. By using capitalization to divide third level text entities, the string "PotatoMatic" (not including the double quotes), if found in first level position 7, would contain third level entities "Potato" (7.1.1) and "Matic" (7.1.2).

Further division of third level entities into fourth level, fifth level, sixth level, and so on, are also contemplated. This hierarchical ordering of text entities may also be employed to recognize groups of first level entities as higher order constructs, such as noun phrases, sentences, paragraphs, documents, collections of documents, web sites, and the like.

Depending on the context, certain formatting characters may or may not be indexed as text entities. For example, in the English language, a white space character appearing in the text would typically be used to identify first level text entity boundaries. In white space delimited contexts such as English and many other languages, the space character itself would not be indexed as a text entity, but simply used to determine the boundaries of first level text entities. During text reconstruction, sequential first level text entities would be separated by a space character by default. Other formatting characters, such as line and paragraph breaks, would be indexed individually as first level text entities. Preserving non-default formatting characters, such as line and paragraph breaks, enables more accurate reconstruction of the original source, as well as a more useful measure of proximity between text entities that have one or more significant format entities between them.

In other contexts, such as the Korean language, the space character is not universally used between text entities. In this and like contexts, the space character is as significant a formatting character as a paragraph break and a line break, both for proximity and reconstruction, and as such would be indexed as a first level text entity along with other formatting characters.

For written languages consisting of ideographic characters, each ideograph is an idea unto itself, and white space is rarely used to separate one ideograph from another. In this situation, each ideograph represents its own first level text entity. Any white space character in this context would be significant for reconstruction and proximity purposes, and therefore would be indexed.

As previously discussed, identifying an English word in text is problematic. A number of assumptions are often made by parsing algorithms to isolate words for indexing and retrieval. By way of example, some of these assumptions include the following: words will not include any non-alphabetic type characters, white space type characters delimit words, hyphen characters "-"(though non-alphabetic) will be permitted in words, and words will be delimited by standard punctuation (e.g. periods, commas, question marks, exclamation points, and the like). However, a large class of strings exist in text which do include non-alphabetic type characters (e.g. "CAD/CAM"). Because traditional parsers lack the ability to capture these strings as words, they provide less accurate search results and less accurate data mining exercises.

For purposes of illustration only, the remainder of this invention will be discussed in the context of a body of text written in the English language, where the space character is the default first level text entity delimiter. Other formatting characters are preserved as first level text entities. As previously discussed, the benefits of the present invention may also be realized in other contexts. For example, a body of text may be written in Kanji, where different rules may be employed to identify text entity boundaries.

Correspondingly, characters are grouped into first level text entities, and they in turn are divided into multiple lower level text entities. A first level text entity comprises one or more sequential non white space characters, or any single formatting character except the space character. Lower level text entities are identified as those sequences of characters in a first level text entity that are all of the same type. Sequences of symbol characters, however, are broken up such that each symbol character is a lower level text entity. Dividing sequences of symbol characters in this way reduces the number of unique entries in the index while providing for more flexible searches.

At this point, by employing linguistic tools, one may identify certain strings of characters as English words. A first level text entity (or a series of lower level text entities) may be considered a word when found in a dictionary or identified by some other linguistic means. In this way, a first level text entity represented by the character string "mailman" may be identified as an English word, and may also be decomposed into two lower level text entities "mail" and "man", also identified as English words. Additional linguistic analysis may be performed to further identify text entities as words belonging to a language, and such techniques are well known to those skilled in the art.

Furthermore, as is standard in the industry, words may be associated with their morphologic root forms (often referred to as stemming), which normalizes the words into standard forms. By normalizing a word, searches requesting a given form of a morphologic root will obtain search hits on all related variants. For example, a search on "indexing, ""indices," or "indexes" would receive a search hit on the morphologic root of "index." In a similar way, thesaurus terms may be associated with words, so that additional variations of words may be found when performing a search. For example a search for the word "appease" would receive a search hit for the word "assuage."

This type of linguistics processing is not a further dissection of the character string, but rather an association of a linguistic variant with the original string. These linguistic variants would be stored in the index such that they would not be confused with actual strings from the source text. The search engine could then choose whether or not to apply linguistic variants in order to expand or narrow the search and modify results relevance.

In many existing search engines, as entities are normalized and augmented, the ordering of the original entities and their original forms are lost. This prevents reconstruction of the original source from the generated index files. The present invention preserves the hierarchical structure of the original source, thereby permitting its reconstruction from the index files.

Figure 1:
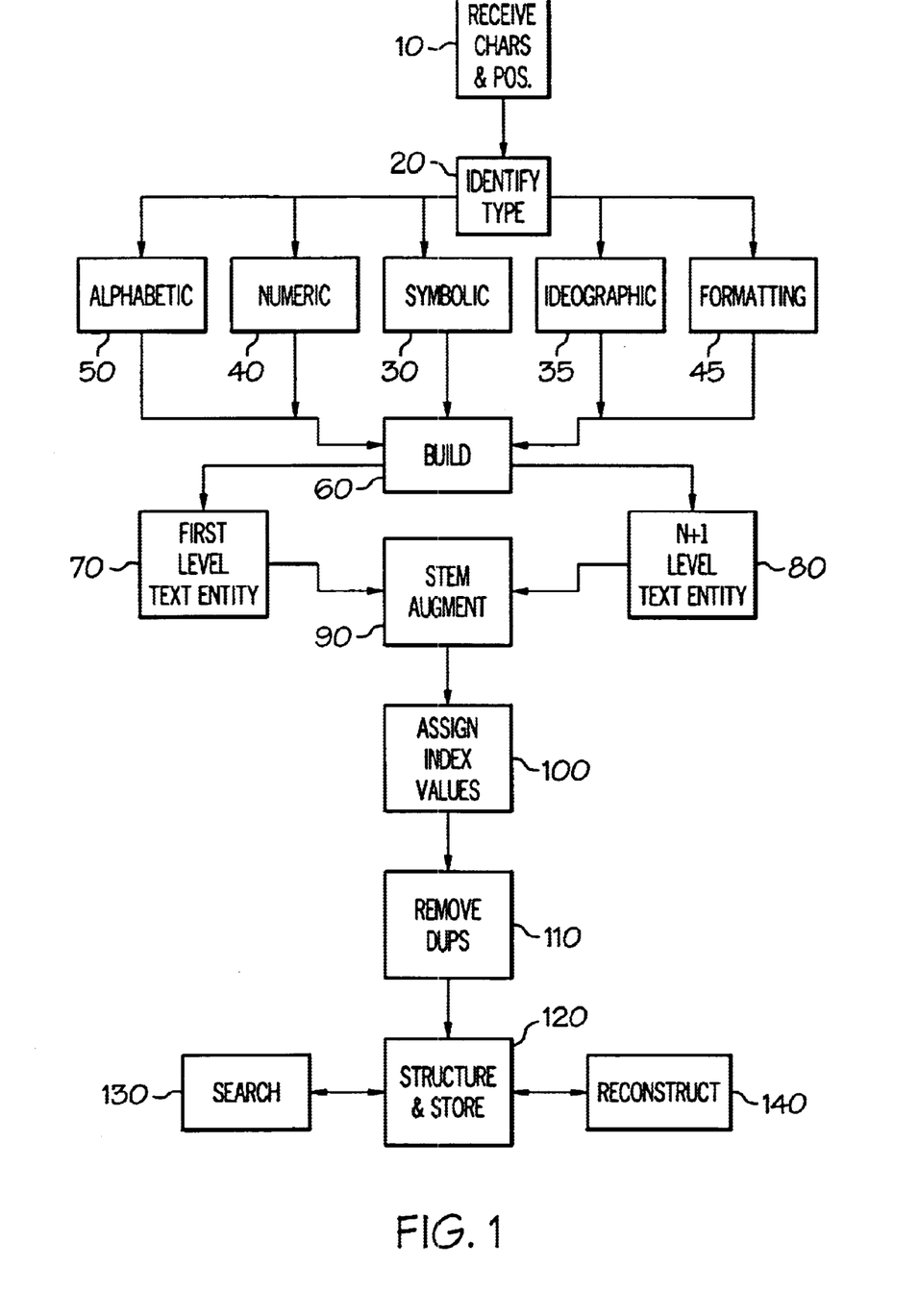
FIG. 1 depicts a flow diagram of a method of parsing and indexing text.

FIG. 1 illustrates a flow diagram of one embodiment for a method of parsing and indexing text. Initially in step 10, individual characters are scanned and identified with a single character at a time being passed through to a parsing set of executable instructions along with a numeric position, which identifies the sequential order of each passed character. For example, an original source file containing only 7 characters, namely "CAD/CAM" (not including the double quotes) would be scanned character by character, passing one character at a time to a parser. Each passed character would have a sequential number identifying its order, such that when the character "D" is encountered, "D" is passed along with a position identifier 3, indicating that "D" is the third character passed by the scanner. Although, as one skilled in the art will readily appreciate, the scanner need not pass the numeric position of the character since the parser could compute this information automatically.

Furthermore, each scanned character is associated with a type in step 20. These types include alphabetic (step 50), numeric (step 40), symbolic (step 30), ideographic (step 35), and formatting (step 45).

The characters are received individually, along with their associated numeric positions and types. A running string of characters received is assembled using the text entity parsing rules in step 60.

In step 70, the first level text entity boundary rule is applied to assemble the first level text entity. This first level text entity boundary rule appends each incoming character to the current text entity up to but not including the first formatting character encountered. Simultaneously, the lower level text entities within the first level text entity are identified in step 80 by applying the lower level text entity boundary rules. Each first level text entity receives a sequential number, the first identified first level text entity receives the number 1, and each subsequently identified first level text entity receives a number n where n is a positive integer which is 1 greater than that assigned to the previously processed first level text entity. Lower level text entities receive a number of the form n.m where n is inherited from the parent text entity in which the lower level text entity is identified, and m is a sequential number beginning with one and incremented each time an additional text entity of the same level is identified in the parent text entity.

An n.0 second level text entity boundary rule identifies the string of sequential characters from the first level text entity beginning with the first alphabetic or numeric character, and ending with the last alphabetic or numeric character. The n.0 second level text entity will be empty or null when the parent first level text entity is composed entirely of non alphanumeric characters. As one skilled in the art will appreciate, the assigning of hierarchical numbers to the parsed text entities in this way permits the original form of the text to be closely maintained and also preserves the ordering of the strings in the original text.

Figure 4:
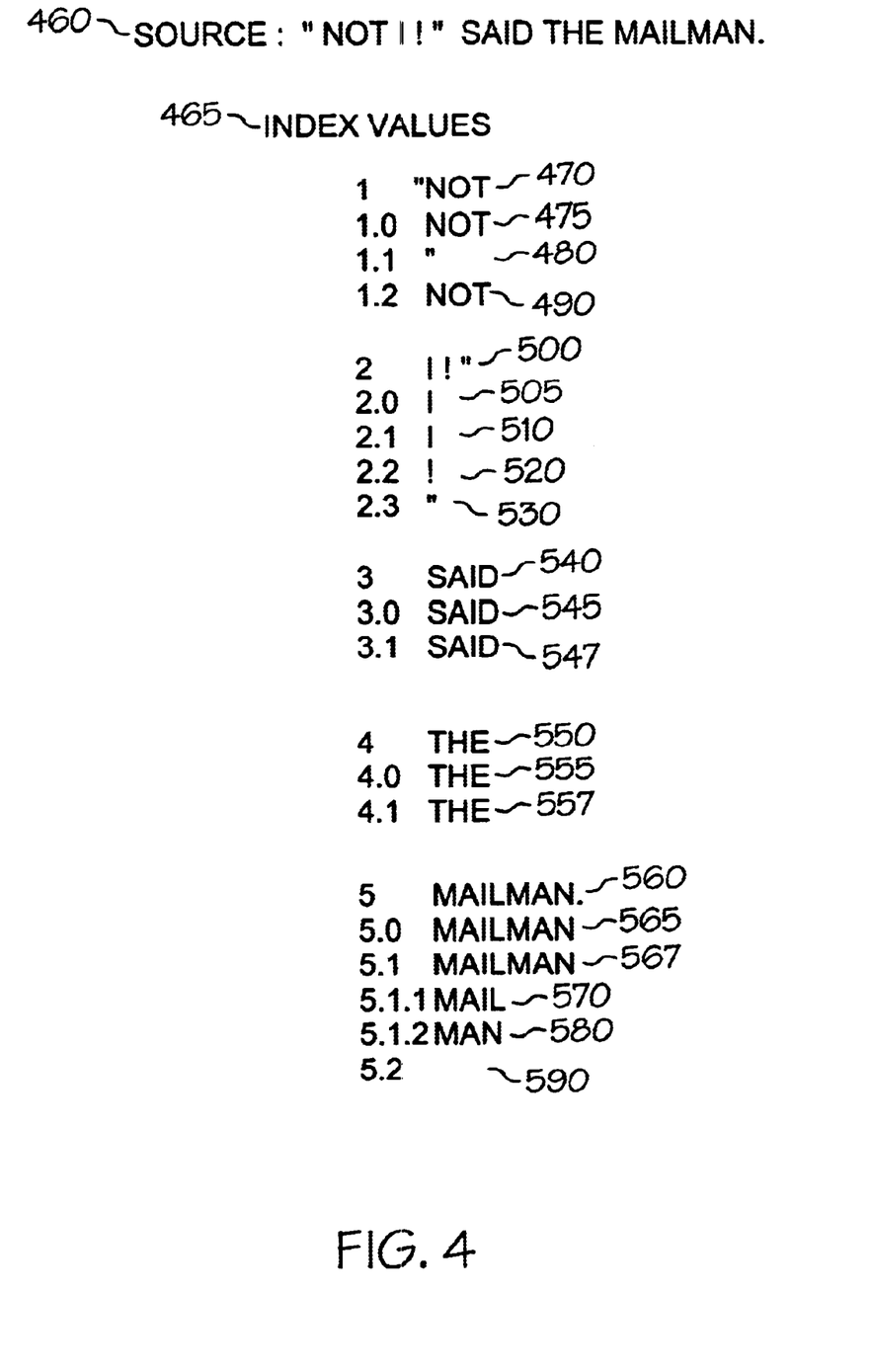
FIG. 4 depicts a schematic diagram for assigning hierarchical index values.

By way of example, FIG. 4 depicts a schematic diagram for assigning hierarchical index values. Initially, a source text is identified (460). This text is serially scanned with each character being identified as a specific character type and passed to a parser where text entities are assembled. The text entities then receive hierarchical values which are stored with them in an index file. Although, as one skilled in the art will appreciate, no file storage need take place since any set of executable instructions performing the tenets of the present invention could essentially parse and index source files in real time with no storage necessary beyond random access memory.

The generated index values (465) are depicted in FIG. 4. The string I!" is identified as the second first level text entity occurring in the source, and therefore receives the index value of 2 (500). This first level text entity is further decomposed into the second level text entity I, which receives an index value of 2.1 (510), where the 2 represents the second occurring first level text entity of the source (460), and the 1 represents the first occurring second level text entity of the parent first level text entity. Next, two symbol type second level text entities are detected, ! and ". They receive index values of 2.2 (520) and 2.3 (530) respectively, representing their positions in the second first level text entity. In this way, the index (465) maintains the ordering of the text entities extracted from the source (460).

Although a specific example has been used which describes a hierarchical indexing method using numbers and decimal points, as one skilled in the art will readily appreciate, any hierarchical scheme which can be constructed that records the hierarchical relationship and ordering of the text entities extracted from the source may be deployed in accordance with the present invention.

Returning again to FIG. 1, after first level text entities are identified, the index may be further augmented in step 90, by stemming the text entities to obtain the morphologic roots and by associating thesauri terms, phonetic representations, and other useful variants with each of the entities. The index entries containing these augmentations are specially marked such that it is readily apparent that these augmentations are not part of the original source. By way of example only, a stemmed word "index" to be associated with a text entity "indexing" might receive a negative index value, indicating that "index" was a generated term placed in one or more of the index files to augment one or more of the text entities. As one skilled in the art will appreciate, any consistent way to identify these generated terms will suffice.

As previously discussed in step 100, index values are assigned to the entities and stored in one or more of the indexes in step 120. For purposes of efficiency, only uniquely occurring entity strings need be maintained in one or more of the indexes along with a list of values which identify the locations where the entity occurs in the source (step 110). For example, a text entity string "CAD/CAM" may be stored singly as "CAD/CAM" but may have occurred 3 times in the source. In this instance, an entry in an index is more efficiently stored as "CAD/CAM" 158 where "CAD/CAM" was the first, fifth, and eighth first level text entity in the source. As one skilled in the art will appreciate, this method of hierarchically indexing permits subsequent reconstruction of the source. When reconstructing space delimited languages such as English, a reconstruction algorithm (step 140) would insert a space between sequential first level text entities where neither of the two sequential first level text entities is itself a formatting character. In other non space delimited contexts, a reconstruction algorithm would insert only explicitly indexed formatting characters (which may be a space or any other formatting character).

Moreover, by hierarchically assigning index values in the manner described above, more intelligent proximity searching may be performed against a source. For example, a proximity search request of "CAD within one word of device" made against an index which split words at symbol characters, would fail to return a search hit against a source containing "CAD/CAM device". In this type of index, since both "CAD" and "CAM" are identified as separate words and the slash "/" is not retained, the word "CAD" is two words away from the word "device." However, in the present invention, a search hit against the same source would occur since "CAD" would have an index value of 1.1 and "device" an index value of 2, thereby indicating that "CAD" is within one first level text entity of "device."

Finally, in step 120 the generated index is optionally structured and stored to permit interfacing with search requests 130 and reconstruction 140 of the source. Structuring the index file may be done by simply sorting the index lexically, or storing the various components (entities and hierarchical index values) in a database. As is apparent to one skilled in the art, more than one index file may be generated. The entities need not be stored with the index values, but may be stored separately, with only a reference to the corresponding index values.

Figure 2:
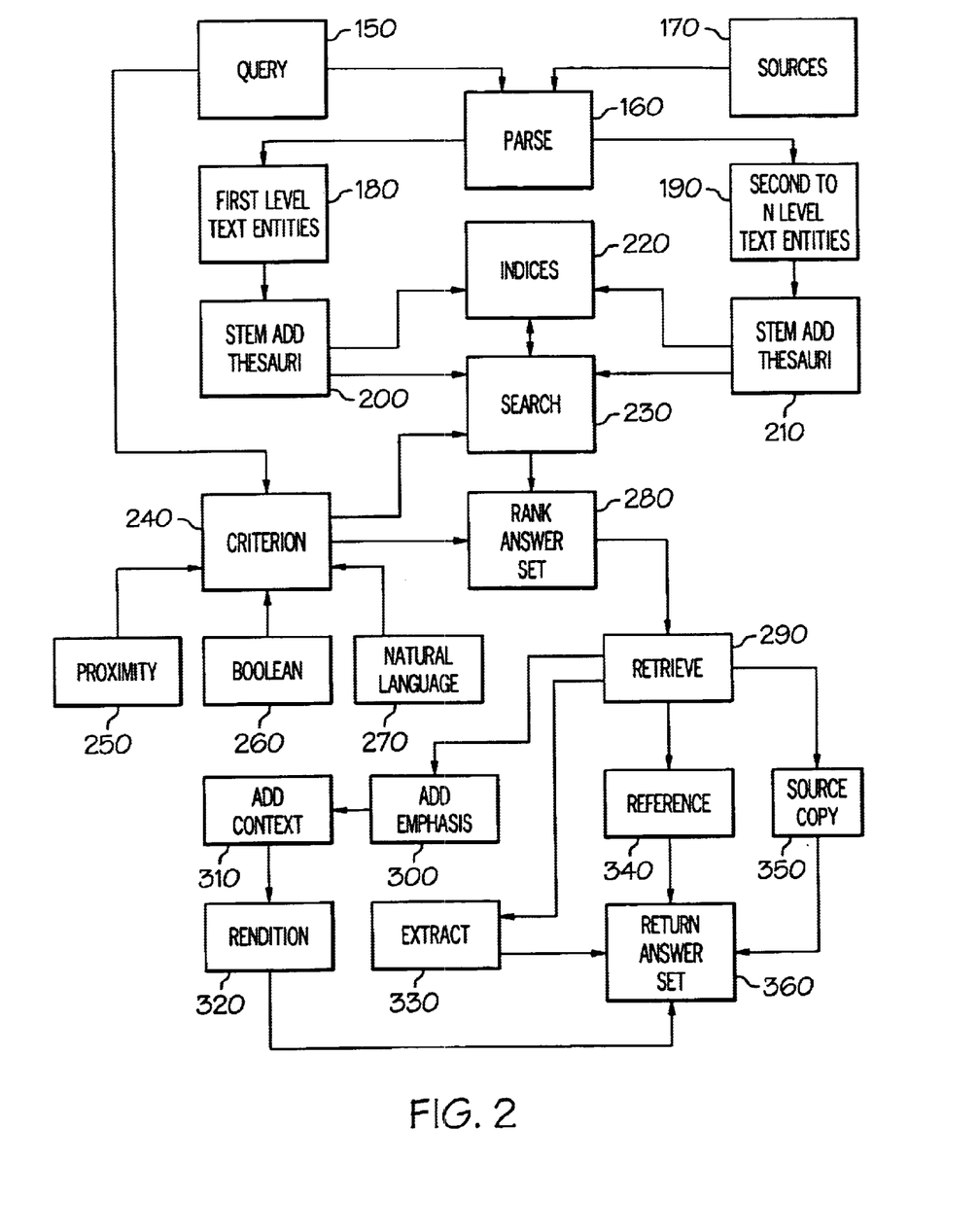
FIG. 2 depicts a flow diagram of a method of data retrieval.

FIG. 2 illustrates a flow diagram of one-embodiment of a method for data retrieval. Initially, a search query is received in step 150 and parsed, as described above with FIG. 1 into first level text entities (step 180), and lower level text entities (step 190). The text entities may be augmented by stemming for roots and adding thesaurus terms in steps 200 and 210. Moreover, the text entities may be further augmented using any other applicable linguistic variant (not shown). The search query also has characters which comprise elements of a search syntax (step 240), which may conform to a variety of standard searching techniques, such as by way of example only, proximity (step 250), boolean (step 260), and natural language (step 270).

In step 230 a search occurs, using the parsed search query terms and the target search sources in step 170. The target sources may have been previously parsed and indexed or may have been indexed when the search request occurred. Furthermore, text entities and the values derived from the sources may be assembled into generated indexes in step 220. Assuming, a search hit occurred against the target sources using the search query, a ranked answer set is returned from the search in step 280.

The need for ranking search query answer sets is well known in the art. The question arises of how to rank documents containing text entities. The algorithms for ranking the following two cases are included here as part of this invention. First, a first level text entity formed of alphabetic lower level text entities separated by a non alphabetic character, such as "CAD/CAM," is generally treated as if each lower level text entity were separate. That is, the first level text entities "ice/cream," "ice.cream," and "ice@cream" are all very similar to two adjacent first level text entities, "ice cream," and hence ranked the same. This principle can be linguistically extended to include the removal of the separating character to form a single first level text entity. That is, the adjacent first level text entities "ice cream" might be contracted into a single first level text entity "icecream" which would also be ranked the same. Thus, if the search query is for "CAD/CAM," a document containing that exact text entity would have the relevance rank calculated as if it were for the phrase "CAD CAM." Secondly, there is one exception to this rule as treating lower level text entities separate for the purpose of relevance ranking. If the search query is for a text entity such as "novell," and the document contained "john@novell.com," then the relevance would be calculated to be lower than for a document containing only the exact hit "novell." This type of ranking algorithm is depicted in step 280 of FIG. 2.

Once the answer set is known, it is retrieved in step 290 where it may be presented to the search requester in a variety of forms, such as, by way of example only, providing a rendition (revised version, step 320), providing an extract of the target sources (step 330), providing a reference to the target sources (e.g. hypertext link, step 340), and providing a copy of the target sources (step 350). Moreover, in providing a rendition of the target sources in step 320, emphasis may be added to search terms found in step 300, and a context of the search hits provided in step 310. Adding emphasis or a context is achieved, by way of example only, by inserting presentation tags either around search terms or in the proximity of search terms. As one skilled in the art will appreciate, emphasis and presentation tags are operable to permit text to be presented or displayed in a defined manner within browsers, viewers, or editors. For example, the emphasis tags of "<bold>" and "</bold>" inserted around a search term of "index" would instruct a web browser to bold "index" without displaying the emphasis tags themselves within the browser. Moreover, a context may be presented by placing the emphasis tags within a defined number of words around the search terms. Finally, the answer set is returned in any of the above discussed formats to the search requester in step 360.

Figure 3:
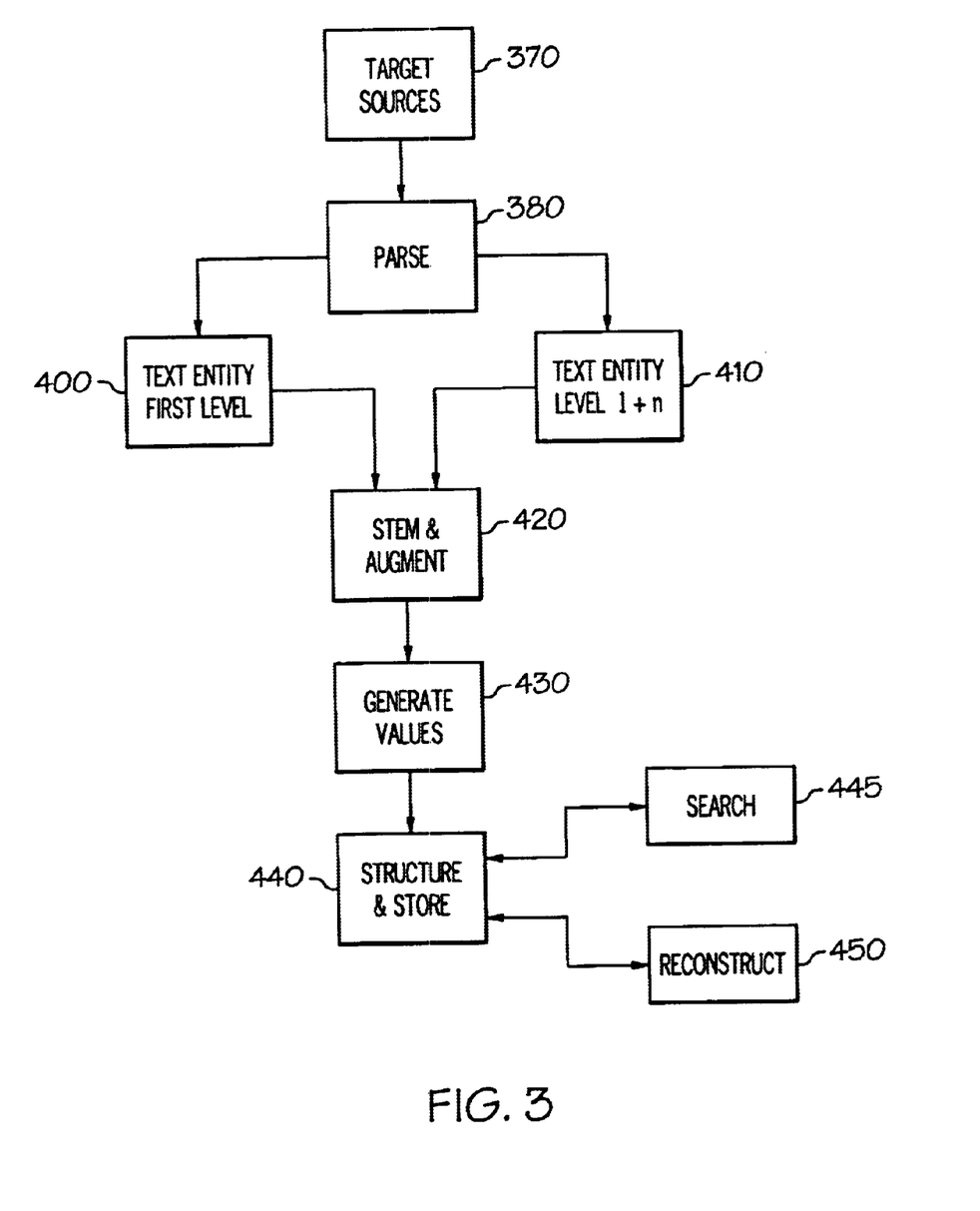
FIG. 3 depicts a flow diagram of a method of warehousing index terms.

FIG. 3 illustrates a flow diagram of one embodiment for a method of warehousing index terms. One or more target sources are received in step 370, and strings are parsed (step 380) into first level text entities in step 400 and lower level text entities in step 410. The text entities are augmented by stemming and thesauri generation in step 420 (or by generating any other desired linguistic variants), and the hierarchical index values are assigned in step 430 for each text entity. The text entity strings and their concomitant hierarchical index values are structured (e.g. sorted or organized for performance improvement) and stored in one or more index files in step 440. Once the hierarchical index values and text entities are warehoused, a search may be performed against the warehouse in step 445, and the warehouse may be used to reconstruct the target sources in step 450. Although, as previously discussed, the index values may be stored with the entities, this need not be the case. In fact, performance is improved when entities are not stored with the index values, but only references to the index values are stored with their corresponding entities. In this way, the index files are nothing more than a series of associated numbers, making access to them and organization of them much more efficient. Furthermore, searching the index for entities becomes more efficient when the entities are separately stored and structured.

Moreover, FIG. 3 depicts lower level text entities 410 which may be parsed more than one time to generate additional lower level text entities. For example, the text entity "mailman" may actually also be an English word "mailman", as well as two separate lower level text entities which are also English words, "mail" and "man."

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed is:

1. A method of parsing and indexing text using a set of executable instructions, comprising:

receiving one or more characters;

recognizing one or more of the characters as a first level text entity, wherein the first level text entity comprises a string of characters from a source text whose boundaries are delineated by spaces;

recognizing one more of the characters of the first level text entity as one or more lower level text entities, wherein the lower level entities are separated by at least one of a special character and one or more rules;

assigning a first level value with the first level text entity operative to determine a position of the first level text entity in a source text; and assigning one or more lower level values subordinate to the first level value with the lower level text entities, wherein each lower level value is assigned a value that has a hierarchical relationship with respect to a first level value such that the lower level values are thereby operative to indicate one or more positions of the lower level text entities in the first level text entity.

2. The method of claim 1, further comprising:

parsing the first level text entity into at least one or more of the lower level text entities wherein the lower level text entities include at least one of one or more alphabetic entities, one or more numeric entities, one or more symbolic entities, one or more ideographic entities, and one or more formatting entities.

3. The method of claim 1, further comprising:

storing in a computer readable medium the first level value, the first level text entity, the lower level values, and the lower level text entities.

4. The method of claim 3, further comprising:

organizing the first level value, the first level text entity, the lower level values, and the lower level text entities on the computer readable medium, the organization operative to permit searching of the values and entities and operative to substantially reconstruct a rendition of the source text.

5. The method of claim 1, further comprising:

stemming the first level text entity to generate one or more linguistic roots associated with the first level text entity; and stemming one or more of the lower level text entities to generate one or more linguistic roots associated with each lower level text entity.

6. The method of claim 1, further comprising:

associating one or more thesaurus terms with first level text entity; and associating one more thesaurus terms with one or more of the lower level text entities.

7. A method of data retrieval using a set of executable instructions, comprising:

parsing a search query into a search criterion, one or more first level text entities, and one or more lower level text entities, wherein each of the one or more first level text entities comprises a string of characters whose boundaries are delineated by a formatting character, and wherein each lower level text entity is a sub-part of a corresponding first level text entity;

searching one or more index sources, which is derived from one or more original sources, in accordance with the search criterion for substantial matches on at least one of one or more of the first level text entities and one or more of the lower level text entities; and returning at least one of a reference to a matching source, a rendition of the matching source, at least a portion of the matching source, and the matching source when searching has determined one or more substantial matches, the matching source corresponding to one or more of the original sources.

8. The method of claim 7, further comprising:

returning with the rendition of the matching source one or more emphasis characters operable to emphasize at least one of the first level text entities and the lower level text entities within the rendition of the matching source.

9. The method of claim 7, further comprising:

returning with the rendition of the matching source one or more context characters operable to present a context of at least one of the first level text entities and the lower level text entities within the rendition of the matching source.

10. The method of claim 7, further comprising:

augmenting the search query prior to searching with at least one of one or more stemmed first level text entities and one or more stemmed lower level text entities;

augmenting the search query prior to searching with at least one of one or more thesaurus terms for the first level text entities and one or more thesaurus terms for the lower level text entities.

11. The method of claim 7, further comprising:

returning a ranked set of search hit sources when searching determines substantial matches in one or more original sources.

12. The method of claim 11, further comprising:

ranking the returned set such that search hit sources with one or more matching first level text entities having alphabetic lower level text entities which are separated by non alphabetic characters are ranked as if the alphabetic lower level text entities were distinct first level text entities.

13. The method of claim 7 wherein the search criterion is a proximity attribute operative to permit searching based on the proximity of the entities to one another in the original sources.

14. The method of claim 7, further comprising:

generating one or more of the index sources from the one or more of the original sources during the searching step.

15. A method of warehousing index terms using a set of executable instructions, comprising:

receiving one or more target sources;

parsing each target source into one or more first level text entities and one or more lower level text entities, wherein each of the one or more first level text entities comprises a string of characters whose boundaries are delineated by a formatting character;

associating one or more first level values with each first level text entity, each first level value operative to determine one or more positions for each first level text entity within one or more of the target sources;

associating one or more lower level values subordinate to the first level values for each of the lower level text entities, wherein the one or more of the lower level text entities are subsets of the first level text entities, the lower level values having a hierarchical relationship with respect to the first level values so as to indicate one or more positions for each lower level text entity within one or more of the target sources;

storing in one or more index sources the values and the entities; and organizing the first level text entities and the lower level text entities thereby permitting substantial reconstruction of one or more of the target sources from one or more of the index sources.

16. The method of claim 15, wherein only a single occurrence of one or more of the first level text entities and one or more of the lower level text entities are stored.

17. The method of claim 15, further comprising:

storing a stemmed first level text entity for each first level text entity; and storing a stemmed lower level text entity for each lower level text entity.

18. A method of claim 15, further comprising:

storing one or more thesaurus terms for each first level text entity and for each lower level text entity.

19. The method of claim 15, further comprising:

parsing one or more lower level text entities into one or more additional lower level text entities.

\* \* \* \* \*